United States Patent [19]
Abu-Isa et al.

[11] Patent Number: 5,775,779
[45] Date of Patent: Jul. 7, 1998

[54] POLYURETHANE THERMOPLASTIC ELASTOMER MEMBRANE FOR SEAT SUSPENSION

[75] Inventors: Ismat Ali Abu-Isa, Rochester Hills; Craig Bryant Jaynes, Bloomfield Hills; Youssef Tishbi, Farmington Hills; Joseph John Zwolinski, Warren, all of Mich.

[73] Assignee: General Motors Corporation, Detroit, Mich.

[21] Appl. No.: 826,178

[22] Filed: Mar. 27, 1997

[51] Int. Cl.$^6$ ................................................. A47C 7/02
[52] U.S. Cl. ........................ 297/452.56; 525/66; 525/76
[58] Field of Search .................... 297/452.56; 528/76, 528/80

[56] References Cited

U.S. PATENT DOCUMENTS

| | | | |
|---|---|---|---|
| 3,272,890 | 9/1966 | O'Leary | 260/859 |
| 3,411,824 | 11/1968 | White et al. | 297/452.56 |
| 3,512,831 | 5/1970 | Flint | 297/452.56 X |
| 4,342,847 | 8/1982 | Goyert et al. | 525/66 |
| 4,423,185 | 12/1983 | Matsumoto et al. | 525/66 |
| 4,492,408 | 1/1985 | Lohr | 297/452.56 X |
| 4,583,783 | 4/1986 | Kanai | 297/452.56 |
| 4,702,522 | 10/1987 | Vail et al. | 297/452.56 |
| 4,787,948 | 11/1988 | Ermert | 156/164 |
| 4,834,458 | 5/1989 | Izumida et al. | 297/452.56 X |
| 4,842,257 | 6/1989 | Abu-Isa et al. | 297/452.56 |
| 4,842,794 | 6/1989 | Hovis | 264/145 |
| 4,883,320 | 11/1989 | Izumida et al. | 297/452.56 |
| 4,939,183 | 7/1990 | Abu-Isa et al. | 521/138 |
| 4,975,207 | 12/1990 | Lee | 525/66 X |
| 5,009,827 | 4/1991 | Abu-Isa et al. | 264/156 |
| 5,013,089 | 5/1991 | Abu-Isa et al. | 297/452.56 X |
| 5,149,739 | 9/1992 | Lee | 525/66 |
| 5,171,633 | 12/1992 | Muramoto et al. | 428/374 |
| 5,439,271 | 8/1995 | Ryan | 297/452.56 |
| 5,582,463 | 12/1996 | Linder et al. | 297/452.56 X |

*Primary Examiner*—Peter R. Brown
*Assistant Examiner*—Rodney B. White
*Attorney, Agent, or Firm*—George A. Grove

[57] ABSTRACT

A seat suspension membrane is provided which consists substantially of a biaxially oriented film of a polyurethane thermoplastic elastomer composition, which composition is characterized by substantially linear polymer molecules containing alternate rigid segments of diisocyanate short chain diol addition reaction products and flexible segments of relatively high molecular weight polyether diol or polyester diol segments and which is produced from a relatively soft film composition.

8 Claims, 2 Drawing Sheets

POLYURETHANE THERMOPLASTIC ELASTOMER MEMBRANE FOR SEAT SUSPENSION

TECHNICAL FIELD

This invention relates to oriented polyurethane thermoplastic elastomer membranes and, more particularly, it provides such an elastomeric membrane for a seat suspension member.

BACKGROUND OF THE INVENTION

There is a need to reduce the thickness or profile of seats, especially seats for automotive vehicles and the like. U.S. Pat. Nos. 4,842,257; 4,939,183 and 5,009,827 each pertain to a vehicle seat suspension for an automotive vehicle wherein a thin, high strength elastomeric membrane is formed and directionally oriented to provide a useful seat suspension. The high strength elastomeric membrane provides a seating surface that initially yields when a passenger sits on the seat but becomes more firm if an additional load is applied to the passenger and seat such as the vertical impacts applied by the vehicle traveling over a bumpy road. In the case of the elastomeric membrane disclosed in the above-identified patents, the composition was a block copolymer of polytetramethylene terephthalate polyester and polytetramethylene ether. When processed in accordance with the teachings of the above patents, a useful seat suspension membrane is formed.

There is an ongoing need to find less expensive, more readily processable and higher strength membranes for such seat suspension applications.

There are many thermoplastic elastomer composition materials which may seem to possess potential as an orientable membrane material for seat suspension members such as those described in the above patents. However, it is found that many such compositions are difficult to process for biaxial orientation or otherwise do not lend themselves to the formation of a suitable seat suspension membrane. For example, it has been found that polyolefinic thermoplastic elastomers, polyamide thermoplastic elastomers, poly (butadiene/styrene) block copolymers and some polyurethane thermoplastic elastomers could not be suitably processed into oriented seat suspension membranes suitable for vehicle application or even comparable to the above polytetramethylene ether and polytetramethylene terephthalate polyester block copolymers. The problem in finding improvements on such oriented polyether-polyester copolymer compositions has proven to be difficult.

Accordingly, it is an object of this invention to provide such a seat suspension membrane and seat structure adapted to utilize the membrane.

SUMMARY OF THE INVENTION

In accordance with this invention, a suitable seat frame structure is provided which is adapted for attachment with a suitable polyurethane thermoplastic elastomer membrane seat suspension member. The seat suspension member is suitably generally rectangular, of sufficient area to serve its seating function and adapted to be suspended at two opposing edges to a suitable seat frame. The seat frame is adapted to hold the seat suspension member under modest tension in a generally horizontal position for seating. Of course, the seat is open at the front for passenger access. The seat frame may have a generally vertical back support member attached to it, and the back member may be hinged and may, when desired, also carry a like elastomeric suspension member for the back support.

In accordance with this invention, the seat suspension membrane consists essentially of a biaxially oriented film of a block copolymer of a suitable polyurethane thermoplastic elastomer composition. As is known, polyurethane thermoplastic elastomers are the polymeric addition reaction products of suitable short chain diols (for example, butane diol), a diisocyanate (for example, toluene diisocyanate or methylene diphenyl diisocyanate), and relatively long chain polyols which are polyester diols or polyether diols. As formulated and as commercially available, such polyurethane thermoplastic elastomer compositions are characterized by generally linear polymer molecules that contain flexible or soft segments of the polyol domains that alternate with relatively hard or rigid polymeric segments of the reaction product of the diisocyanate and short chain diol.

In accordance with this invention, the starting material is a film or membrane of extruded polyurethane thermoplastic elastomer composition. In order to produce a suitable seat suspension structure (e.g., a rectangular film) from the membrane, it is oriented biaxially in two perpendicular directions such as lengthwise and widthwise. Such orientation is accomplished by drawing the membrane in two directions so as to permanently deform and orient the uncrosslinked polymeric chains and thereby increase the membrane's modulus of elasticity in the directions of orientation and reduce its elongation at break in such directions.

A difficulty is that not all polyurethane thermoplastic elastomer compositions of the above-described type are suitably processable and susceptible to biaxial drawing as is required to accomplish the results of this invention. The chemical composition of suitable polyurethane thermoplastic elastomers for such biaxial orientation will be specified below, as will the properties of unoriented starting compositions. Even within such ranges of composition and properties, some polyurethane thermoplastic elastomers are more difficult to extrude and orient than other grades. Therefore, some further testing of compositions specified herein may be necessary to obtain the most desirable seat suspension membranes as are intended to be provided.

However, the seat suspension membranes of this invention offer significant advantages in seat structures, especially seat structures for automotive vehicles. Suitable polyurethane thermoplastic elastomer compositions are relatively inexpensive, respond very favorably to extrusion and biaxial orientation of the polymer molecules within the membrane, and in a final product possess directional moduli of elasticity that produce a comfortable seat for a vehicle passenger that also resists further deformation (e.g., bottoming out) of the seat suspension when the vehicle is traversing a rough road.

These and other advantages of the invention will become more apparent from a detailed description thereof which follows. Reference will be had to the drawings in which:

DESCRIPTION OF THE PREFERRED EMBODIMENT

Vehicle Seat Application

Figure 1:
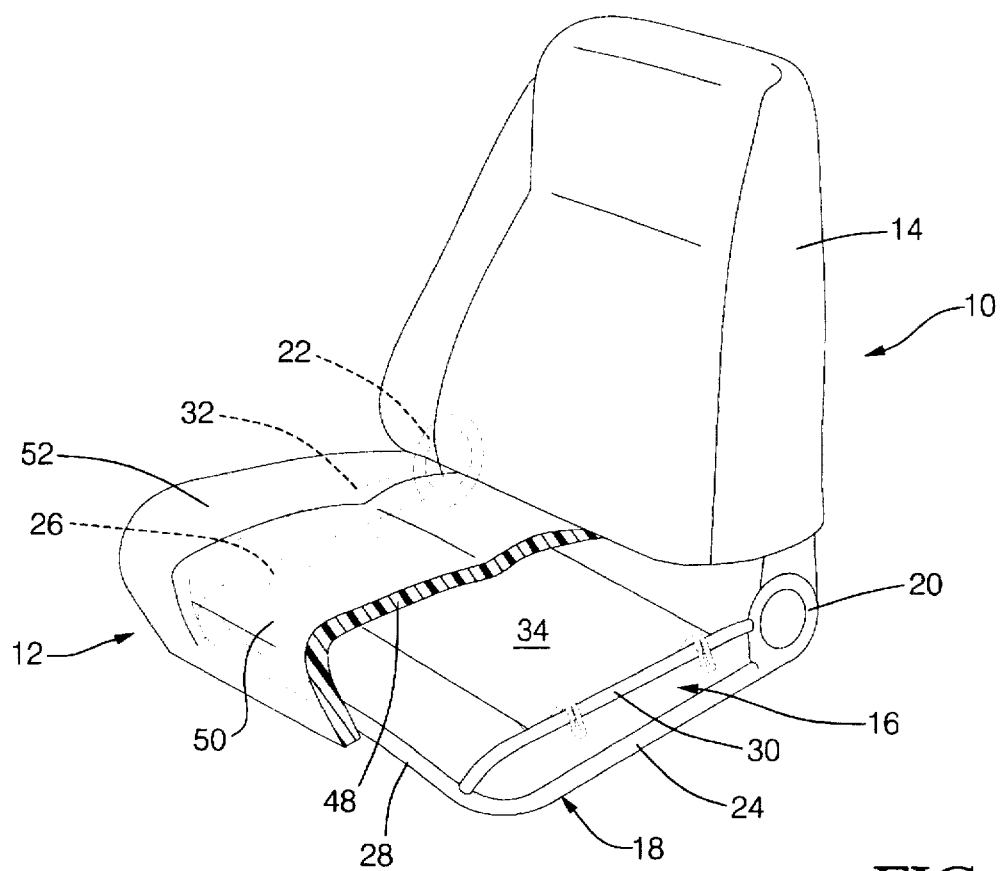
FIG. 1 is a perspective view, partly cut away and in section, of a vehicle seat utilizing a seat suspension membrane of this invention.

The polyurethane thermoplastic elastomer membranes of this invention are intended to be employed in a seat construction of the type which is illustrated in FIG. 1. In FIG. 1, a vehicle seat assembly 10 is illustrated including a generally horizontal seat portion 12 and a back support portion 14. The seat portion 12 includes a frame member 16 which, as illustrated, is a U-shaped tube or bar 18 and adapted to be fixed to the floor of the vehicle. Attached to the end portions of the tube 18 are brackets 20 and 22 to which the back support 14 of the seat is connected. The connection to brackets 20, 22 may be a hinged connection so that the back 14 may be pushed forward if desired. Thus, U-shaped tube 18 has two side legs 24 and 26 and a base leg 28 at the front of the seat. The seat frame 16 also comprises two horizontal bars 30, 32 that extend respectively from upper portions of the brackets 20, 22 to the front leg 28 of tube frame 18. These horizontal side members 30, 32 are the supporting members for the polyurethane thermoplastic elastomer membrane 34 which constitutes the seat suspension member of this invention.

Figure 2:
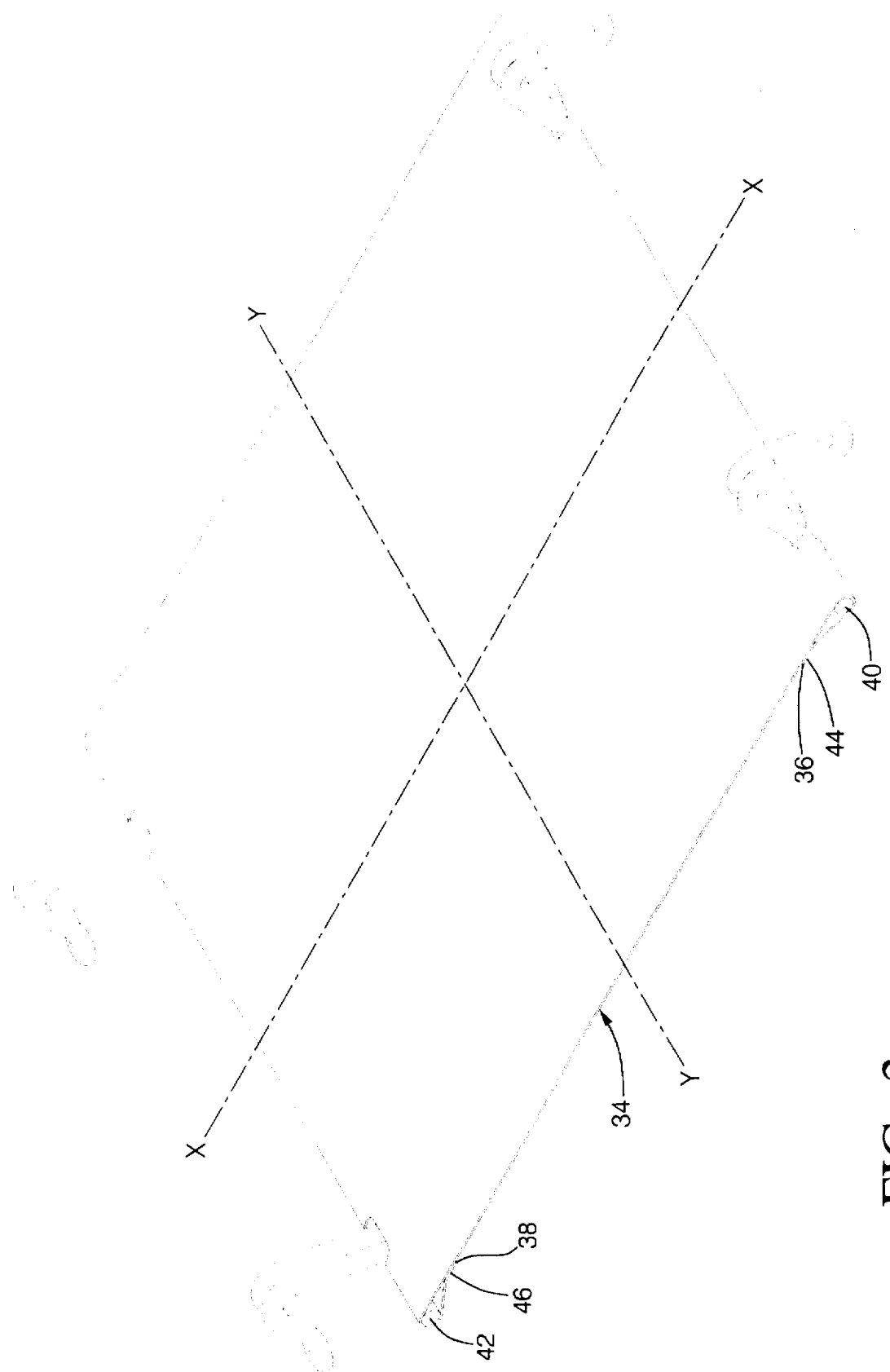
FIG. 2 is a plan view of a seat suspension member of this invention.

Referring to FIGS. 1 and 2, the edges 36, 38 of the seat membrane are folded around wire hooks 40, 42 at the lateral edges of the suspension and heat sealed at 44, 46 to the membrane 34 surface. As seen, the wire hooks 40, 42 are shaped both to extend along the edges of the membrane 34 and to form suitable means for attachment to the side bars 30, 32.

The seat suspension membrane 34 is covered with a thin layer of flexible foam material 48 or other padding (FIG. 1) which will provide a comfortable feel when a passenger is seated under static load conditions. It is preferred that the comfortable foam layer be softer and have a lower modulus than the modulus of the seat suspension member. The softness of the comfortable layer is selected to enable it to conform to the shape of the passenger and transfer the shape to the seat suspension where the static load is further conformed and supported, as will be described.

In the FIG. 1 illustrated arrangement, the comfortable layer 48 also includes a cloth trim covering 50. The comfortable layer 48 is represented showing side bolsters 52 (only one shown) for lateral support of the passenger. A critical portion of this seat structure is the polyurethane thermoplastic elastomer membrane 34 which, when suitably formed and processed, constitute the seating suspension member of this invention. In prior processing as described below, the membrane 34 has been oriented in x—x (side to side) and y—y (front to back) directions as shown in FIG. 2 to provide the desirable seating properties of this invention. The membrane 34 may be stretched elastically about 8% to 12% in the side-to-side direction during seat assembly.

In a typical vehicle seating application, the thickness of membrane 34 is suitably about 0.2 to 0.3 millimeter.

Figure 3:
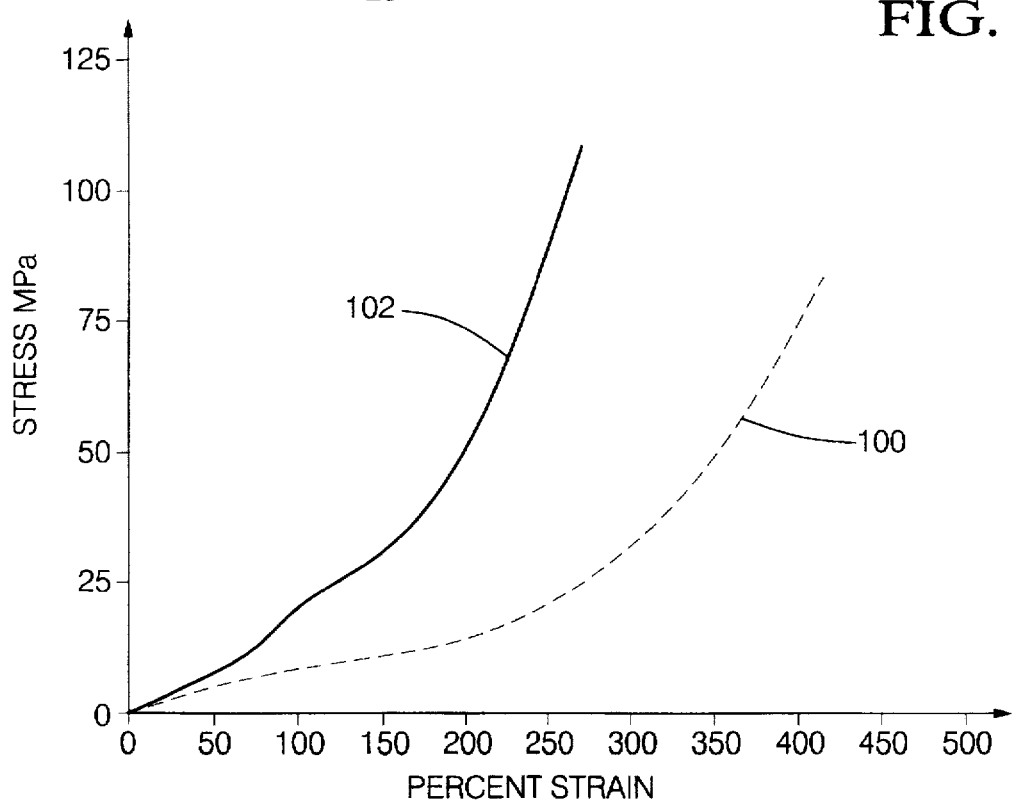
FIG. 3 is a plot of stress-strain curves of a biaxially-oriented seat suspension membrane of this invention.

The effect of the orientation in one or both of the side-to-side and front-to-back directions is to strengthen the membrane in these directions and, importantly, to provide it with a "dual modulus" tensile stress-strain curve in each oriented direction as illustrated in FIG. 3, for example. Such dual modulus directional properties mean that the seat membrane initially yields readily under a normal seat load to provide comfort. However, upon further loading as from rough ride impacts, the "comfortable seat" does not easily yield further and bottom out.

In the case of the subject membrane 34, it is generally preferred that the direction of greatest orientation in the membrane be set in the front-to-back position of the seat.

Membrane Technology

Polyurethane thermoplastic elastomers are made of block copolymers consisting of rigid and hard crystalline urethane blocks chemically connected to relatively soft amorphous blocks of polyether or polyester molecular units. The degree of elasticity of the thermoplastic elastomers depends on the molar ratio of the soft segments to the hard segments. The higher ratios of soft segment give rise to more elastic behavior in the polyurethane films. All grades of the polymer are processable as thermoplastics, i.e., they can be injection molded or extruded just like a thermoplastic. The polyurethane thermoplastic elastomers are characterized by polymer molecules that are not chemically bonded together by crosslinks. Instead, the crystalline blocks of the polymers act as physical crosslinks below their melting point and disappear as crosslinks when the crystallites melt. The material is recyclable and articles made of it can be reground and reprocessed many times.

Prior patents show a vehicle seat suspension component and its method of manufacture (U.S. Pat. No. 4,842,257), the suspension being made of a block copolymer consisting of polytetramethylene ether and polytetramethylene terephthalate polyester. Prior patents also show a method of manufacture of the elastomeric membrane (U.S. Pat. No. 4,939,183), and a process for forming the membrane (U.S. Pat. No. 5,009,827). The driving force for the work described in this disclosure was to find a material that is more robust as far as processability is concerned and has lower cost. Initially, a matrix of twelve thermoplastic elastomers were tested—six were block copolymers of polyurethane, two were copolyester polyethers, two were polyolefinic, one was based on polyamide hard segment, and the last one was a poly(butadiene/styrene) block copolymer. It appeared that none of these thermoplastic elastomers had been oriented to produce a useful product.

Preliminary orientation studies showed that not all of these polymers can be oriented. Actually, no significant drawing or orientation could be achieved for one of the polyurethanes, one of the polyesters, and the poly(butadiene/styrene). The studies were conducted using a biaxial orientation apparatus. As a rule, it was attempted to effect the biaxial drawing at a temperature 20° C. below the melting or softening point of the polymer. If that failed, orientation of samples was attempted at slightly higher or lower temperatures.

The tensile properties of the oriented and unoriented films of each of the nine successfully oriented polymers were determined using an Instron mechanical testing equipment. All samples were tested per ASTM D 412 at a crosshead speed of 50 mm/minute. The results are shown in Table I. For comparison, tensile properties on the copolyester polyether material described in previous patents are also shown in the Table. Although there is quite a bit of scatter in the data, it is obvious that drawing of the polymers leads to molecular orientation, which gives rise to an increase in tensile strength and a decrease in elongation at break for all samples. It was surprising to observe that much higher tensile strength was obtained for the oriented polyurethane films than for the copolyester polyether under the same draw ratios.

TABLE I

SUMMARY OF PRELIMINARY ORIENTATION STUDY

| Material | Draw Ratio | Tensile Strength (MPa) | Elongation at Break (%) | Tear Strength (N/mm) |
|---|---|---|---|---|
| Copolyester polyether Hytrel D4056 (DuPont) | 1 | 42 | 737 | 114 |
| | 2 | 43 | 744 | 131 |
| | 3 | 54 | 503 | 161 |
| Polyester polyurethane Elastollan S90A (BASF) | 1 | 66 | 512 | 129 |
| | 1.5 | 65 | 455 | 160 |
| | 2 | 73 | 344 | 155 |
| | 3 | 82 | 279 | 109 |
| | 4 | 96 | 196 | 91 |
| Polyamide Pebax 4033 (Elf Atochem) | 1 | 47 | 580 | 142 |
| | 2 | 46 | 594 | 185 |
| | 3 | 55 | 283 | 129 |
| Polypropylene/ EPDM Santoprene 103-40 | 1 | 18 | 453 | 78 |
| | 2 | 23 | 404 | 81 |
| | 3 | 26 | 325 | 79 |
| Polyester polyurethane Estane 58092 (B. F. Goodrich) | 1 | 64 | 416 | 126 |
| | 1.5 | 74 | 478 | 129 |
| | 2 | 88 | 219 | 127 |
| | 3 | 85 | 285 | 112 |
| Polyester polyurethane Texin 285 (Bayer) | 1 | 67 | 514 | 111 |
| | 1.5 | 86 | 789 | 117 |
| | 2 | 84 | 225 | 112 |
| Polyester polyurethane Elastollan 1190A (BASF) | 1 | 61 | 482 | 125 |
| | 1.5 | 73 | 450 | 124 |
| | 3 | 79 | 228 | 93 |
| Polyester polyurethane Pellethane 2103-90A | 1 | 59 | 361 | 136 |
| | 1.5 | 79 | 584 | 142 |
| | 3 | 105 | 173 | 97 |
| (Dow Chemical) Copolyester polyether Lomod TE 3010A (GE) | 1 | 46 | 411 | 201 |
| | 1.5 | 48 | 269 | 230 |
| | 2 | 60 | 201 | 203 |
| Polypropylene/ EPDM Polytrope TTP 403-31 (Schulman) | 1 | 31 | 595 | 109 |
| | 2 | 36 | 508 | 106 |
| | 3 | 45 | 186 | 106 |

Because of the excellent properties exhibited by most of the polyurethane thermoplastic elastomers, four of the polymers were chosen for further development and large scale evaluation. Early runs showed that the Pellethane was processable into films only through a narrow window of temperatures and drawing rates and ratios. For this reason, Pellethane was dropped from further evaluations. The Elastollan (S-90 A) polyester-based urethane, the Elastollan (1190) polyether urethane, and a Texin (985U) polyether urethane elastomer (not previously tested) were used for further evaluation and development. Some of the properties and processing conditions of these materials prior to orientation are shown in Table II.

TABLE II

PROPERTIES AND PROCESSING CHARACTERISTICS OF CHOSEN POLYURETHANE THERMOPLASTIC ELASTOMERS

| Property | Polymer | | | |
|---|---|---|---|---|
| | Pellethane 2103-90A | Elastollan S-90A | Elastollan 1190 | Texin 985U |
| Melt Index 220° C., g/10 min. | 23 | 14 | 40 | 9.6–13.4 |
| Specific Gravity | 1.14 | 1.23 | 1.13 | 1.20 |
| Tensile Strength (MPa) | 45 | 40 | 32 | 41 |
| Elongation at Break (%) | 450 | 560 | 575 | 550 |
| Vicant Softening Point (°F.) | 224 | 230 | 230 | 176 |
| Shore Hardness A: | 92 | 92 | — | 86 |
| D: | 41 | 41 | 42 | — |
| Flex Modulus (MPa) | 76 | 54 | 48 | 27 |
| Drying Conditions Prior to Molding (°F./Time) | 190° F./5 Hrs. | 180° F./6 Hrs. | 180° F./5 Hrs. | 170° F./8 Hrs. |
| Melt Temperature (°F.) | 400 | 430 | 420 | 410 |
| Recommended Temperature (°F.) for Drawing | 240 | 240 | 240 | 200 |

A large scale processing evaluation was conducted at an industrial film extrusion and rolling facility. The process included casting a film of each of the three selected compositions by extrusion using a 75 mm diameter extruder. The conditions of the extrusion were adjusted for each material to give a film with uniform thickness and without surface defects. The films were then air cooled and passed through five sets of rolls for machine direction orientation (MDO). The rolls were used for sheet preheating, slow stretch, fast stretch, heat set, and cooling. The speeds and temperatures of all rolls were adjusted to give a film with the desired orientation. In some cases, the films were passed through a tenter frame placed inside an oven equipped with five zones of temperature control. The tenter frame consisted of two rails equipped with clamps to hold the polymer film. Orientation of the film in the transverse machine direction (TDO) is accomplished by widening the distance between the rails holding the film as it passes through the oven.

The processing conditions used for extrusion, MDO drawing, and TDO drawing of the Texin (985U) are shown in Table III. The three heating zones in the extruder barrel were controlled at temperatures ranging between 350° F. and 410° F. Between the extruder barrel and the die, an adapter barrel was placed to allow unhindered extrusion of the film on the casting roll. The temperature of the adapter was controlled at 410° F. to 430° F. The die temperatures were in the range of 380° F. to 400° F. Under these conditions, the resulting polymer melt temperature was between 398° F. and 408° F., when the extruder screw speed was maintained at 38 to 48 rpm. Temperature adjustments within the range mentioned above were made in order to produce a smooth and defect-free film surface.

TABLE III

EXTRUSION AND ORIENTATION CONDITIONS FOR POLYETHER URETHANE MATERIAL OBTAINED FROM TEXIN (985U)

| Extrusion Conditions | | | | | | | | |
|---|---|---|---|---|---|---|---|---|
| Extruder Barrel Temperature, °F. | | | Adapter Temperatures, °F. | | | Die Temperatures, °F. | | |
| Zone 1 | Zone 2 | Zone 3 | Zone 1 | Zone 2 | Zone 3 | Zone 1 | Zone 2 | Zone 3 |
| 350–380 | 360–410 | 370–410 | 410–420 | 420–430 | 420–430 | 380–400 | 400 | 400 |

| Polymer Melt Temperature, °F. | Extruder Screw Speed (RPM) | Extruder Pressure (PSI) |
|---|---|---|
| 398–408 | 38–48 | 650–670 |

| MDO Line Drawing Conditions | | | | |
|---|---|---|---|---|
| Preheat Roll Temperature, °F. | Slow Draw Roll Temperature, °F. | Fast Draw Roll Temperature, °F. | Annealing Roll Temperature, °F. | Cooling Roll Temperature, °F. |
| 199–201 | 200 | 209–211 | 197–201 | 64–66 |

| TDO Line Drawing Conditions | | |
|---|---|---|
| Preheat Zone Temperature, °F. | Stretch Zone Temperature, °F. | Annealing Zone Temperature. °F. |
| 200–250 | 210–255 | 180–210 |

The MDO drawing line conditions are also shown in Table III. As seen in the table, the temperatures used during drawing of the film had to be kept at low values of 197° F. to 211° F. for successful drawing of the films in a continuous manner and without film breakage during stretching. Similarly, the temperatures inside the tenter frame were also controlled at low values to insure successful orientation in the transverse machine direction.

The properties of four batches of film made under different orientation conditions are shown in Table IV. The nominal thickness of the films was about 0.25 mm. As expected, orientation leads to increase in tensile strength, a decrease in elongation, and an increase in tear strength. However, for this material, it seems that an optimum draw ratio of about four results in the best balanced properties of the film. Beyond this, draw ratio properties start to degrade. Of the four batches that were made, the best properties were exhibited by the film having draw ratios of 2.1 MDO and 3.9 TDO. The draw ratio is calculated from machine settings of roll speeds relative to each other during MDO drawing or clamp separation during TDO drawing of the film. The stress strain curves of samples cut in the MDO (100) and TDO (102) directions of the film are shown in FIG. 3. The dual modulus character of these samples is evident from the graph.

TABLE IV

PROPERTIES OF ORIENTED FILMS MADE FROM TEXIN (985U)

| Draw Direction | Draw Ratio | Tensile Strength (MPa) | Elongation at Break (%) | Tear Strength (N/mm) |
|---|---|---|---|---|
| MDO | 1.5 | 68 | 280 | 99 |
| TDO | 1 | 56 | 514 | 113 |
| MDO | 2.1 | 72 | 296 | 122 |
| TDO | 3 | 78 | 272 | 108 |
| MDO | 2.1 | 88 | 426 | 143 |
| TDO | 3.9 | 99 | 264 | 108 |
| MDO | 2 | 63 | 346 | 210 |
| TDO | 5.3 | 82 | 129 | 72 |

The processing conditions and properties of eight batches of oriented polyester urethane material obtained from BASF (S-90) are shown in Tables V and VI, respectively. For this polymer, the temperatures of the orientation line were raised to higher values than used in the previous sample. The MDO preheat and draw stations were maintained at temperatures between 234° F. and 296° F., while the TDO oven temperatures ranged between 200° F. and 301° F. The properties of the oriented films were similar to those of the Texin samples.

TABLE V

EXTRUSION AND ORIENTATION CONDITIONS FOR POLYESTER URETHANE MATERIAL OBTAINED FROM BASF (S-90)

Extrusion Conditions

| Extruder Barrel Temperature, °F. | | | Adapter Temperatures, °F. | | | Die Temperatures, °F. | | |
|---|---|---|---|---|---|---|---|---|
| Zone 1 | Zone 2 | Zone 3 | Zone 1 | Zone 2 | Zone 3 | Zone 1 | Zone 2 | Zone 3 |
| 460–482 | 450–465 | 385–410 | 375–390 | 390–400 | 380–385 | 380–400 | 382–397 | 377–400 |

| Polymer Melt Temperature, °F. | Extruder Screw Speed (RPM) | Extruder Pressure (PSI) |
|---|---|---|
| 370–378 | 50–80 | 650–1560 |

MDO Line Drawing Conditions

| Preheat Roll Temperature, °F. | Slow Draw Roll Temperature, °F. | Fast Draw Roll Temperature °F. | Annealing Roll Temperature, °F. | Cooling Roll Temperature °F. |
|---|---|---|---|---|
| 234–264 | 254–265 | 267–296 | 269–290 | 63–69 |

TDO Line Drawing Conditions

| Preheat Zone Temperature, °F. | Stretch Zone Temperature, °F. | Annealing Zone Temperature, °F. |
|---|---|---|
| 265–270 | 265–283 | 200–301 |

TABLE VI

PROPERTIES OF ORIENTED FILMS MADE FROM BASF (S-90A)

| Draw Direction | Draw Ratio | Sample Angle with Respect to MDO | Tensile Strength (MPa) | Elongation at Break (%) | Tear Strength (N/mm) |
|---|---|---|---|---|---|
| MDO | 2.5 | 0 | 105 | 340 | 173 |
| TDO | 5.3 | 90 | 104 | 175 | 131 |
| MDO | 2.5 | 0 | 79 | 224 | 151 |
| TDO | 4.1 | 90 | 104 | 141 | 127 |
| MDO | 2.5 | 0 | 85 | 211 | 141 |
| TDO | 1 | 90 | 63 | 1311 | 142 |
| MDO | 2.5 | 0 | 98 | 221 | 140 |
| TDO | 4.1 | 90 | 98 | 138 | 132 |
| MDO | 1.7 | 0 | 87 | 297 | 241 |
| TDO | 5.9 | 90 | 95 | 101 | 88 |
| MDO | 2.5 | 0 | 96 | 376 | 196 |
| TDO | 4.9 | 90 | 105 | 155 | 121 |
| MDO | 1.7 | 0 | 73 | 303 | 140 |
| | | 30 | 73 | 257 | 118 |
| | | 45 | 73 | 213 | 107 |
| | | 60 | 71 | 141 | 77 |
| TDO | 5.1 | 90 | 90 | 107 | 90 |
| MDO | 3 | 0 | 95 | 196 | 78 |
| | | 30 | 94 | 167 | 80 |
| | | 45 | 94 | 152 | 78 |
| | | 60 | 85 | 127 | 72 |
| TDO | 5.9 | 90 | 103 | 84 | 57 |

The processing conditions and properties of ten batches of oriented films made of polyether urethane BASF (1190) are shown in Tables VII and VIII. Some of the films were made from a resin containing 2% carbon black concentrate BASF (917), which is added for UV stability. Again, higher temperatures were used for stretching in the MDO and TDO directions. The properties of the oriented films were excellent. The best balance of properties was obtained for samples oriented to a draw ratio of 4.

TABLE VII

EXTRUSION AND ORIENTATION CONDITIONS FOR POLYESTER URETHANE MATERIAL OBTAINED FROM BASF (1190)

| Extrusion Conditions | | | | | | | | |
|---|---|---|---|---|---|---|---|---|
| Extruder Barrel Temperature, °F. | | | Adapter Temperatures, °F. | | | Die Temperatures, °F. | | |
| Zone 1 | Zone 2 | Zone 3 | Zone 1 | Zone 2 | Zone 3 | Zone 1 | Zone 2 | Zone 3 |
| 340–470 | 350–482 | 360–420 | 395–405 | 395–400 | 375–390 | 379–395 | 370–404 | 388–425 |

| Polymer Melt Temperature, °F. | Extruder Screw Speed (RPM) | Extruder Pressure (PSI) |
|---|---|---|
| 368–401 | 60–81 | 540–1620 |

| MDO Line Drawing Conditions | | | | |
|---|---|---|---|---|
| Preheat Roll Temperature, °F. | Slow Draw Roll Temperature, °F. | Fast Draw Roll Temperature °F. | Annealing Roll Temperature, °F. | Cooling Roll Temperature °F. |
| 235–240 | 241–260 | 241–286 | 240–270 | 56–66 |

| TDO Line Drawing Conditions | | |
|---|---|---|
| Preheat Zone Temperature, °F. | Stretch Zone Temperature, °F. | Annealing Zone Temperature, °F. |
| 240–270 | 220–270 | 202–230 |

TABLE VIII

PROPERTIES OF ORIENTED FILMS MADE FROM BASF (1190A)

| Draw Direction | Draw Ratio | Sample Angle with Respect to MDO | Tensile Strength (MPa) | Elongation at Break (%) | Tear Strength (N/mm) |
|---|---|---|---|---|---|
| 1190 Samples | | | | | |
| MDO | 2.4 | 0 | 88 | 284 | 157 |
| TDO | 5.0 | 90 | 91 | 89 | 69 |
| MDO | 2.4 | 0 | 85 | 299 | 136 |
| TDO | 4.3 | 90 | 104 | 105 | 71 |
| MDO | 2.0 | 0 | 73 | 263 | 120 |
| | | 30 | 78 | 245 | 79 |
| | | 45 | 78 | 190 | 109 |
| | | 60 | 71 | 155 | 86 |
| TDO | 4.5 | 90 | 91 | 106 | 57 |
| 1190 + 2% 917 Samples | | | | | |
| MDO | 2.0 | 0 | 71 | 254 | 70 |
| TDO | 4.7 | 90 | 88 | 133 | 81 |
| MDO | 2.1 | 0 | 82 | 296 | 176 |
| TDO | 2.9 | 90 | 94 | 192 | 102 |
| MDO | 2.1 | 0 | 84 | 205 | 145 |
| TDO | 2.9 | 90 | 94 | 208 | 96 |
| MDO | 3.0 | 0 | 105 | 165 | 117 |
| TDO | 2.5 | 90 | 80 | 296 | 111 |
| MDO | 4.0 | 0 | 112 | 99 | 128 |
| MDO | 2.0 | 0 | 71 | 246 | 185 |
| | | 30 | 82 | 209 | 143 |
| | | 45 | 81 | 174 | 110 |
| | | 60 | 83 | 145 | 111 |
| TDO | 4.7 | 90 | 96 | 106 | 107 |

Polyurethane films are easier to process and have better properties at equivalent draw ratios than the Hytrel films. They are also lower cost materials. They are intended herein for use as seat suspensions. The method for making the subject seat suspension is easier and less costly than the method needed to make a woven filament suspension. In the case of a woven filament suspension, after the filament is extruded and oriented, the fabric is woven and cut to size, wire hooks are inserted, and "sleeves" are created by the use of adhesives. In the case of polyurethane film suspension, the film is extruded and oriented, then it is cut to size and wire hooks are inserted through cut holes and the "sleeves" are formed by sealing the film on itself as illustrated in FIGS. 1 and 2. Therefore, not only one process (weaving) is eliminated; also, the use of adhesive is eliminated.

Thus, in seat membrane manufacture, a combination of heat and pressure to "seal" the polyurethane film on itself may be employed to form the desired "sleeves" and to hold the wire hooks in place. An automobile seat suspension has been made from oriented polyurethane film (BASF resin 1190) by using the heat sealing process described above. This suspension was incorporated in a regular production seat in a 1994 Pontiac Grand Am for engineering evaluation. The polyurethane suspension performed very well in providing comfort and support.

Care must be taken in the selection and film extrusion of polyurethane thermoplastic elastomers to obtain the oriented membranes of this invention. For example, it is preferred that the starting polyurethane materials for the subject membranes have a Shore A hardness value of 95 or less. It is also preferred that unoriented sheets of the starting polyurethane thermoplastic elastomers have stress values at 100% elongation and 300% elongation that are, respectively, less than 13 MPa and 25 MPa. The elongation at break measured on unoriented sheets at room temperature should not be less than 300%.

Experience also suggests that suitable polyurethane thermoplastic elastomers for drawing into the oriented membranes of this invention are suitably characterized by a composition in which the mole ratio of hard segment to soft segment is less than about 1.5.

Even within the above-specified ranges of properties and composition, some polyurethane thermoplastic elastomers are more difficult to extrude and orient than other grades. Other factors such as molecular weight, molecular weight distribution and hot tear strength are also likely to affect the extrudability and orientability of a particular polyurethane thermoplastic elastomer in accordance with this invention.

As stated, the thickness of the subject membranes for vehicle seating is nominally about 0.2 to 0.3 mm. Obviously, lesser or greater thicknesses may be desired or required in other applications. It is generally preferred that the membranes have a minimum tensile strength of 50 MPa in any direction in which they are oriented.

While the invention has been disclosed in terms of a few preferred embodiments, it will be appreciated that other forms could readily be adapted by one skilled in the art. Accordingly, the scope of the invention is intended to be limited only by the following claims.

We claim:

1. A seat comprising a seat frame carrying a seat suspension membrane for receiving a seating load, said seat suspension membrane having a side-to-side direction and a front-to-back direction with respect to said seat, said seat suspension membrane consisting essentially of a polyurethane thermoplastic elastomer membrane that is oriented in at least one of said directions, said polyurethane thermoplastic elastomer consisting substantially of generally linear polymer molecules that are characterized by rigid segments of diisocyanate and short chain diol addition reaction products and flexible segments of a polymeric species selected from the group consisting of polyether diols or polyester diols.

2. A vehicle seat as recited in claim 1 in which the molecular ratio of said rigid segments to said flexible segments is less than 1.5.

3. A vehicle seat as recited in claim 1 in which said oriented polyurethane thermoplastic elastomer is the extruded and axially drawn product of a polyurethane thermoplastic elastomer initially having a Shore A hardness value of 95 or less and a room temperature elongation at break that is greater than 300%.

4. A seat comprising a seat frame carrying a seat suspension membrane for receiving a seating load, said seat suspension membrane having a side-to-side direction and a front-to-back direction with respect to said seat, said seat suspension membrane consisting essentially of a polyurethane thermoplastic elastomer membrane that is drawn and oriented in both of said directions, said polyurethane thermoplastic elastomer consisting substantially of generally linear polymer molecules that are characterized by rigid segments of diisocyanate and short chain diol addition reaction products and flexible segments of a polymeric species selected from the group consisting of polyether diols or polyester diols.

5. A vehicle seat as recited in claim 4 in which the molecular ratio of said rigid segments to said flexible segments is less than 1.5.

6. A vehicle seat as recited in claim 4 in which said oriented polyurethane thermoplastic elastomer is the extruded and biaxially drawn product of a polyurethane thermoplastic elastomer initially having a Shore A hardness value of 95 or less and a room temperature elongation at break that is greater than 300%.

7. A biaxially-oriented polyurethane thermoplastic elastomer membrane, said membrane being the extruded and biaxially drawn product of a polyurethane thermoplastic elastomer initially having a Shore A hardness value of 95 or less and a room temperature elongation at break that is greater than 300%.

8. A biaxially-oriented polyurethane thermoplastic elastomer membrane, said membrane being the extruded and biaxially drawn product of a polyurethane thermoplastic elastomer initially having a Shore A hardness value of 95 or less and a room temperature elongation at break that is greater than 300%, said elastomer consisting essentially of generally linear polymer molecules that are characterized by rigid segments of diisocyanate and short chain diol addition reaction products and flexible segments of a polymeric species selected from the group consisting of polyether diols or polyester diols.

* * * * *